(12) United States Patent
Andrews et al.

(10) Patent No.: US 9,760,298 B2
(45) Date of Patent: Sep. 12, 2017

(54) ANONYMIZATION OF IDENTIFYING PORTIONS OF STREAMING DATA

(71) Applicant: Alcatel-Lucent USA Inc., Murray Hill, NJ (US)

(72) Inventors: Daniel M. Andrews, Chatham, NJ (US); Avinash Vyas, East Brunswick, NJ (US); Gordon T. Wilfong, Florham Park, NJ (US); Yihao Zhang, New Providence, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 128 days.

(21) Appl. No.: 14/746,047

(22) Filed: Jun. 22, 2015

(65) Prior Publication Data

US 2016/0313939 A1    Oct. 27, 2016

Related U.S. Application Data

(60) Provisional application No. 62/153,208, filed on Apr. 27, 2015.

(51) Int. Cl.
*G06F 3/06* (2006.01)

(52) U.S. Cl.
CPC ............ *G06F 3/0622* (2013.01); *G06F 3/061* (2013.01); *G06F 3/0655* (2013.01); *G06F 3/0679* (2013.01)

(58) Field of Classification Search
CPC ... H04L 65/607; H04L 2209/34; H04L 9/065; G06F 12/0804; G06F 12/0862;

(Continued)

(56) References Cited

U.S. PATENT DOCUMENTS

2007/0198523 A1*  8/2007  Hayim ............. H04L 29/06027
2016/0224804 A1*  8/2016  Carasso ............. G06F 21/6254

OTHER PUBLICATIONS

European parliament, Directive 2002/58/EC of the European Parliament and Council of Jul. 12, 2002 concerning the processing of personal data and the protection of privacy in the electronic communications sector (Directive on privacy and electronic communications). http://europa.eu/legislation_summaries/information_society/legislative_framework/I24120_en.htm, 2002.

(Continued)

*Primary Examiner* — Mark Giardino, Jr.
*Assistant Examiner* — Edward Waddy, Jr.
(74) *Attorney, Agent, or Firm* — Ryan, Mason & Lewis, LLP (57) ABSTRACT

Techniques are provided for anonymizing data in a data stream. In various embodiments, data in a data stream is anonymized by obtaining a partitioning of a space into a plurality of regions based on previously obtained data elements associated with the space; receiving a data stream comprising a plurality of newly obtained data elements associated with the space, each comprising an identifying portion and an associated sensitive portion; assigning each of the plurality of newly obtained data elements to one of the plurality of regions based on the identifying portion; determining if a full buffer criterion is satisfied for a buffer that stores at least a portion of the plurality of newly obtained data elements; and selecting one of the plurality of regions having a largest number of the newly obtained data elements and recording the associated sensitive portions of the newly obtained data elements in the selected one of the plurality of regions to a non-volatile storage medium on the condition that the full buffer criterion is satisfied.

23 Claims, 5 Drawing Sheets

(58) Field of Classification Search
CPC ......... G06F 12/0866; G06F 2212/2022; G06F 2212/214; G06F 2212/2146; G06F 2212/282; G06F 2212/502; G06F 17/30067; G06F 17/30241; G06F 17/30286; G06F 17/30516; G06F 12/0246; G06F 2212/7203; G06F 21/566; G06F 3/0679

USPC ......... 711/E12.019, E12.008, 100, 103, 113, 711/115, 118, 129, 711; 709/231

See application file for complete search history.

(56) References Cited

OTHER PUBLICATIONS

Aggarwal et al., "A general survey of privacy-preserving data mining models and algorithms", In Privacy-Preserving Data Mining, vol. 34 of Advances in Database Systems. Springer US, 2008.

Andrews et al., "Analysis of—anonymity algorithms for streaming location data", http://etc.bell-labs.com/who/ylz/kanon.pdf.

Becker et al., "Human mobility characterization from cellular network data", Communications of the ACM, 2013.

Cao et al., "CASTLE: Continuously anonymizing data streams", IEEE Trans. on Dependable and Secure Computing, 8(3):337-352, 2011.

Ciriani et al., "k-anonymity",Secure Data Management in Decentralized Systems, pp. 323-353, 2007.

Frias-Martinez et al., "Can cell phone traces measure social development?" In Third Conference on the Analysis of Mobile Phone Datasets, NetMob 2013.

Fung et al., "Privacy-preserving data publishing: A survey of recent developments", ACM Comput. Surv., 42(4).

Hu et al., "Privacy-aware location data publishing", ACM Trans. Database Syst., 35(3), 2010.

LeFevre et al., "Incognito: Efficient full-domain k-anonymity", In 2005 ACM SIGMOD International Conference on Management of Data, SIGMOD '05.

Lima et al., "Exploiting cellular data for disease containment and information campaigns strategies in country-wide epidemics", In Third Conference on the Analysis of Mobile Phone Datasets, NetMob 2013.

Meyerson et al., "On the complexity of optimal k-anonymity", In Twenty-third ACM SIGMOD-SIGACT-SIGART Symposium on Principles of Database Systems, pp. 223-228, New York, NY, USA, 2004. ACM.

S. Muthukrishnan, "Data steams: Algorithms and applications", Foundations and Trends in Theoretical Computer Science, 1(2):117-236, 2005.

H. Z. S. Osborn, "FAANST: Fast anonymizing algorithm for numerical streaming data", In 5th International Workshop on Data Privacy Management, and 3rd International Conference on Autonomous Spontaneous Security, pp. 36-50. Springer-Verlag, 2011.

Park et al., "Approximate algorithms for k-anonymity", In 2007 ACM SIGMOD International Conference on Management of Data, pp. 67-78, New York, NY, USA, 2007. ACM.

Smith et al., "Poverty on the cheap: Estimating poverty maps using aggregated mobile communication networks", In ACM CHI conference on Human Factors in Computing Systems, 2014.

L. Sweeney, "K-anonymity: A model for protecting privacy", Int. J. Uncertain. Fuzziness Knowl.-Based Syst., 10 (5):557-570, 2002.

Zhang et al., "KIDS:—anonymization data stream base on sliding window", In ICFCC, vol. 2, pp. 311-316. IEEE, 2010.

Kolesnikov et al., "Anonymization of Streaming Data", U.S. Appl. No. 14/225,720, filed Mar. 26, 2014.

* cited by examiner

ANONYMIZATION OF IDENTIFYING PORTIONS OF STREAMING DATA

CROSS REFERENCE TO RELATED APPLICATION

This application claims priority to U.S. Provisional Application No. 62/153,208, filed Apr. 27, 2015, incorporated by reference herein in its entirety.

FIELD OF THE INVENTION

The present invention relates generally to techniques, apparatus and systems for anonymizing identifying data, such as location data.

BACKGROUND OF THE INVENTION

This section introduces aspects that may be helpful to facilitating a better understanding of the inventions. Accordingly, the statements of this section are to be read in this light and are not to be understood as admissions about what is in the prior art or what is not in the prior art.

It is often desirable to transform and store a stream of sensitive data so that the transformed data can be analyzed without compromising the privacy of the data of any individual. Each data item in the streamed data typically comprises a first element identifying an individual, such as a name or an address, and a second element containing some private and/or sensitive information about the individual, such as a disease of the individual. The identifying part of the data should be transformed so that the processed stream can be saved for later analysis in a manner that allows the data to be analyzed while maintaining the privacy of the individuals. Generally, researchers and/or analysts viewing the transformed data and associated sensitive data should be able to analyze the data and make reasonable (though approximate) conclusions about the data without being able to identify the sensitive information of any particular individual. For example, researchers may wish to study diseases in a particular neighborhood or region.

Data anonymization techniques can address the privacy concerns and aid compliance with applicable legal requirements. A number of data anonymization techniques have been proposed or suggested that achieve various privacy goals by ensuring that the transformed data has certain properties. For example, k-anonymity techniques require that each individual in the data set must be indistinguishable from k-1 other individuals. As used herein, k is referred to as an anonymity parameter. In addition, l-diversity techniques provide sufficient diversity in the sensitive information associated with individuals. U.S. patent application Ser. No. 14/225,720, filed Mar. 26, 2014, entitled "Anonymization of Streaming Data," now U.S. Pat. No. 9,361,480, incorporated herein by reference, provides methods and apparatus for anonymizing data in a data stream.

SUMMARY OF THE INVENTION

Generally, methods and apparatus are provided for anonymizing data in a data stream. According to one embodiment, data in a data stream are anonymized by obtaining a partitioning of a space into a plurality of regions based on previously obtained data elements associated with the space; receiving a data stream comprising a plurality of newly obtained data elements associated with the space, wherein each of the newly obtained data elements comprises an identifying portion and an associated sensitive portion; assigning each of the plurality of newly obtained data elements to one of the plurality of regions based on the identifying portion; determining if a full buffer criterion is satisfied for a buffer that stores at least a portion of the plurality of newly obtained data elements; and selecting one of the plurality of regions having a largest number of the newly obtained data elements and recording the associated sensitive portions of the newly obtained data elements in the selected one of the plurality of regions to a non-volatile storage medium on the condition that the full buffer criterion is satisfied. In one or more embodiments, each region has a substantially equal number of previously obtained data elements. The full buffer criterion comprises, for example, determining if the buffer is full or if one of the plurality of regions comprises at least k data elements.

According to a further embodiment, the buffer has a fixed size, M, and the partitioning of the space comprises partitioning the space into M/k or approximately 2 M/k regions, where k is an anonymity parameter. In another embodiment, the buffer has a fixed size, M, and the obtaining further comprises defining 2 M/k target regions, and recursively repartitioning the space into successively smaller regions to obtain a number, N, of regions of substantially equal size, wherein said repartitioning continues as long as there exists a region b such that a probability that a given one of said newly obtained data elements is assigned to the region b is greater than 1/N.

Other example embodiments partition the space into the plurality of regions by substantially equalizing a probability that a given one of said previously obtained data elements is assigned to any one of the plurality of regions or by reducing an expected area of the selected one of the plurality of regions.

A more complete understanding of the present disclosure, as well as further features and advantages of various embodiments, will be obtained by reference to the following detailed description and drawings.

DETAILED DESCRIPTION

Embodiments described herein provide methods, apparatus and systems for anonymizing streaming data, e.g., associated with geographical locations, to achieve k-anonymity for streaming data. In one or more example embodiments, location information arrives online into a buffer of fixed size M. Whenever the buffer fills, some data must be stored to permanent storage in a k-anonymized fashion. This notion of anonymity refers to recording a coarse common region containing at least k points instead of separate exact locations. One goal is to reduce the recorded region size so that the anonymized location data is as accurate as possible.

Generally, the example embodiments comprise a preprocessing stage that partitions a space into N regions having similar total traffic, as discussed further below in conjunction with FIG. 3, based on historical data. Various preprocessing embodiments, discussed further below in the section entitled "Preprocessing Functions," partition a given space into N regions based on whether the streaming data arrives according to a uniform or nonuniform distribution over the given space. While one or more illustrative examples partition a space into a plurality of geographic regions, additional or alternative criteria can be used to partition a multi-dimensional space into regions, e.g., other data abstractions, such as age, height, income, medical history, demographic data or other criteria, as would be apparent to a person of ordinary skill in the art.

In addition, the example embodiments comprise an anonymization stage where the online data stream is output as a sequence of at least k-anonymized data to be recorded on a disk or another non-volatile storage mechanism. For example, in one embodiment, the space is partitioned into M/k identical regions to ensure k-anonymity, and the region with the largest occupancy is selected for storage whenever the buffer fills.

Figure 1:
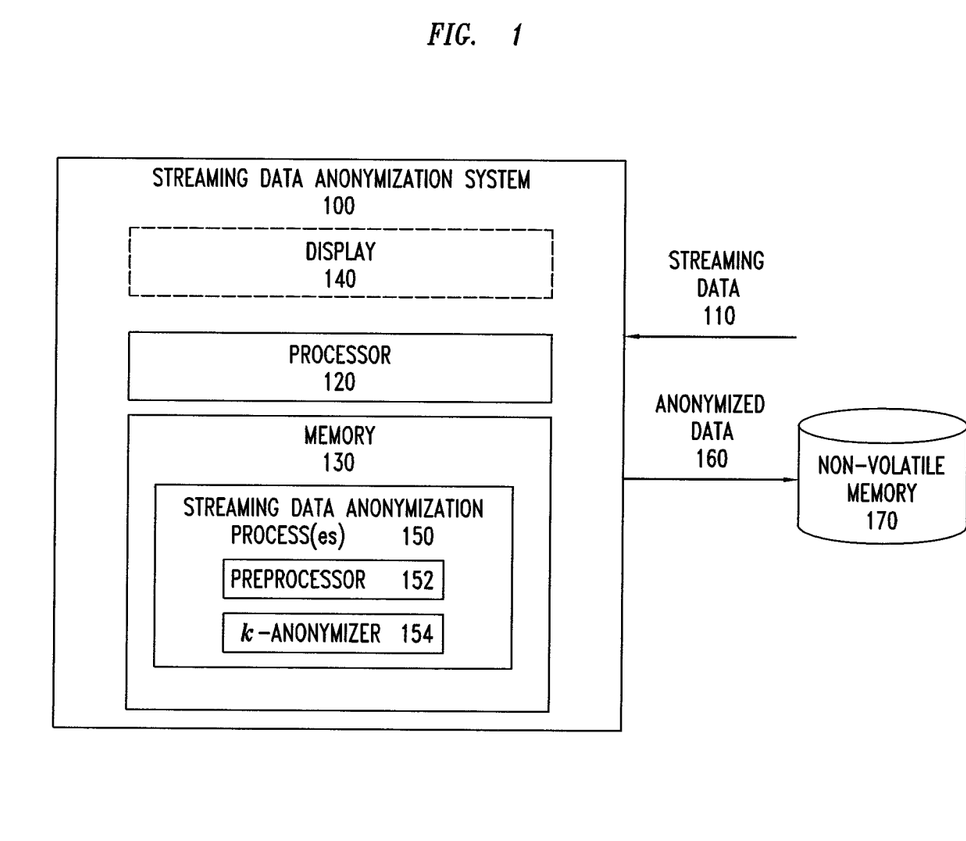
FIG. 1 is a block diagram of an example streaming data anonymization system that can implement the processes of various embodiments.

FIG. 1 illustrates an example streaming data anonymization system 100, e.g., a computer system or processing system, that can implement embodiments of processes within the scope of the disclosure. The example system 100 processes streaming data 110 comprising sensitive data, e.g., associated with a geographical area, in accordance with various embodiments. Each data item in the streaming data 110 typically comprises a first element identifying an individual, such as an address, and a second element containing some private and/or sensitive information about the individual, such as a disease that the individual has. While the identifying information comprises location information in one or more example embodiments, other identifying information can be employed, as would be apparent to a person of ordinary skill in the art.

Various embodiments reflect the recognition that unprotected sensitive data should not be written to a non-volatile memory 170 even temporarily, because it is technically more challenging to ensure the protection of data. Importantly, this may be a legal requirement for a number of important applications.

As shown in FIG. 1, memory 130 configures a processor 120 to implement the streaming data anonymization methods, steps, and functions disclosed herein (collectively, shown as streaming data anonymization process(es) 150 in FIG. 1, and discussed further below in conjunction with FIGS. 2, 4 and 5). The memory 130 could be distributed or local and the processor 120 could be distributed or singular. The memory 130 could be implemented as an electrical, magnetic or optical memory, or any combination of these or other types of storage devices. It should be noted that each distributed processor that makes up processor 120 generally contains its own addressable memory space. It should also be noted that some or all of system 100 can be incorporated into a personal computer, laptop computer, handheld computing device, application-specific circuit or general-use integrated circuit.

The example system 100 employs a non-volatile memory 170 embodied as disk space on one or more storage disks as a secure extension of the volatile memory 130 to store the transformed streaming data 110, referred to herein as anonymized data 160. The volatile memory 130 is also referred to herein as a buffer. The example system 100 optionally also comprises a display 140.

As shown in FIG. 1 and as discussed further below in conjunction with FIG. 2, the example streaming data anonymization process(es) 150 comprise one or more preprocessor functions 152, as discussed further below in a section entitled "Preprocessing Functions," and one or more k-anonymizer functions 154, as discussed further below in conjunction with FIGS. 4 and 5.

Figure 2:
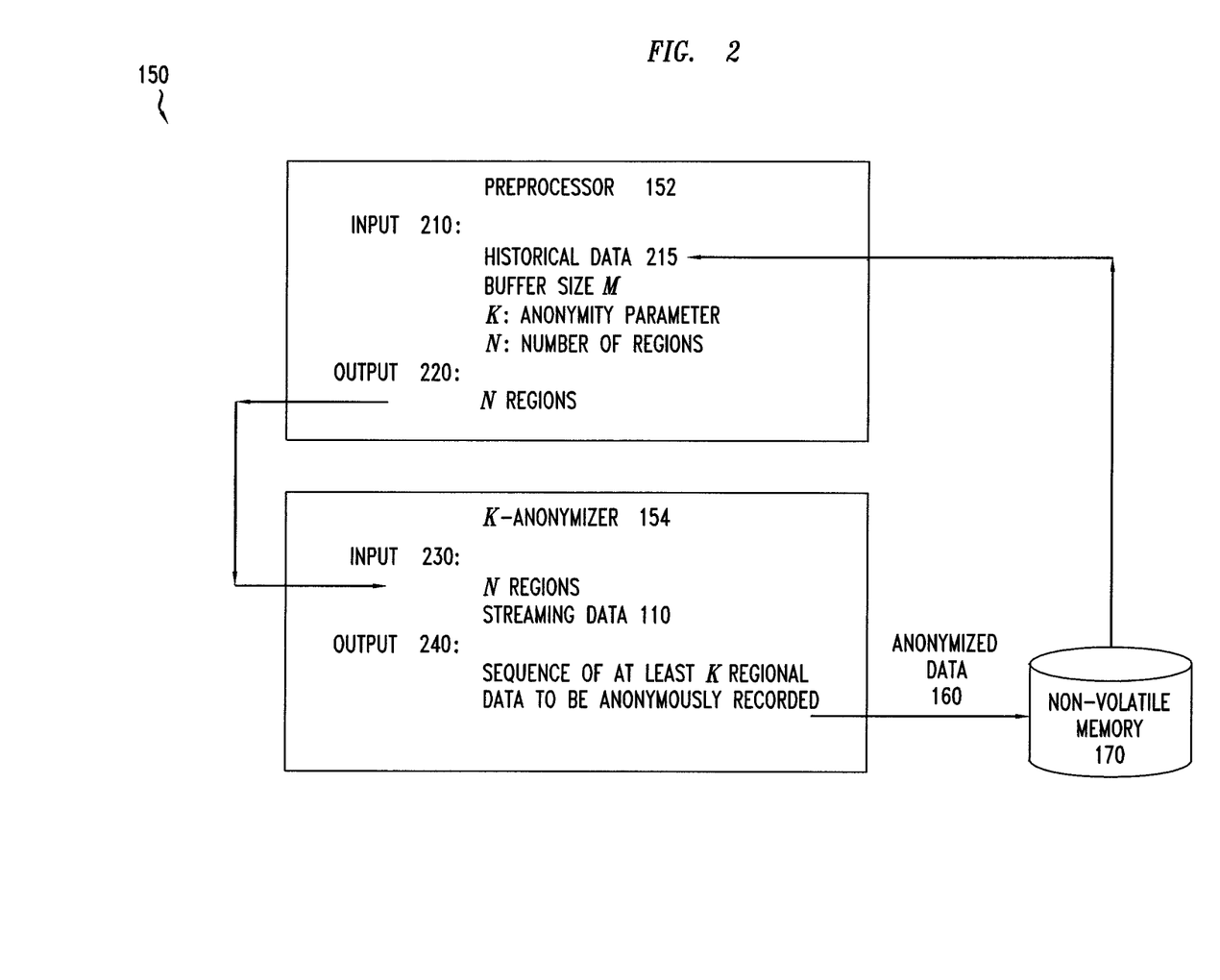
FIG. 2 illustrates the streaming data anonymization processes of FIG. 1 in further detail.

FIG. 2 illustrates the streaming data anonymization process(es) 150 of FIG. 1 in further detail. As noted above, the example streaming data anonymization process(es) 150 comprise one or more preprocessor functions 152 and one or more k-anonymizer functions 154.

As shown in FIG. 2, the one or more example preprocessor functions 152, discussed further below in a section entitled "Preprocessing Functions," receive the following values as input 210: historical data 215 (e.g., previously obtained data associated with a geographical area) from the non-volatile memory 170, a buffer size, M, an anonymity parameter, k, and a number of regions, N. The one or more example preprocessor functions 152 generate N regions having similar total traffic as an output 220. The N regions are discussed further below in conjunction with FIG. 3. In various example embodiments, the N regions of data range in size from M/k to 2 M/k.

As shown in FIG. 2, the one or more example k-anonymizer functions 154, discussed further below in conjunction with FIGS. 4 and 5, receive as an input 230 the output 220 generated by the one or more example preprocessor functions 152. The input 230 comprises the N regions generated by the one or more example preprocessor functions 152. In addition, the input 230 comprises the online streaming data 110 (e.g., newly obtained data associated with the geographical area).

The one or more example k-anonymizer functions 154 generate as an output 240 a sequence of anonymized data 160 to be anonymously recorded on the non-volatile memory 170. In the example embodiment of FIG. 2, the anonymized data 160 comprises a sequence of at least k regional data elements.

Figure 3:
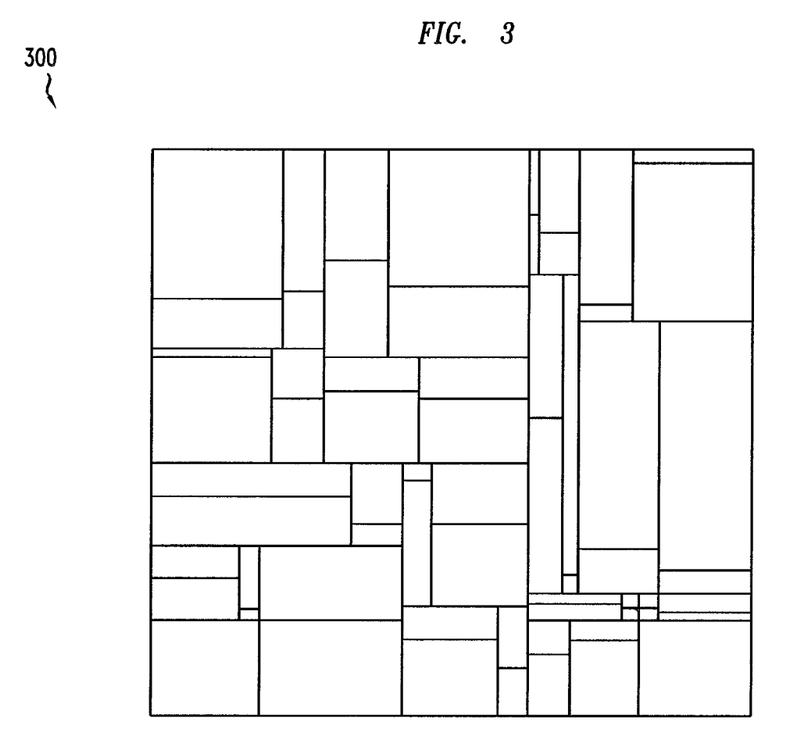
FIG. 3 illustrates an example of a space partitioned into N regions each having similar total traffic.

FIG. 3 illustrates an example of a space 300 partitioned into N regions each having similar total traffic (e.g., a similar total population in each region). As noted above, one or more preprocessing functions 152 partition the space 300 into N regions having similar total traffic, based on the historical data 215 obtained from the non-volatile memory 170. Various preprocessing embodiments discussed below in the section entitled "Preprocessing Functions," partition the given space 300 into N regions when the data arrives according to a uniform or nonuniform distribution over the given space 300. In at least one example embodiment, a preprocessing function 152 partitions the space 300 into N regions having substantially similar populations, based on the historical data 215, such that each of the N regions has a population that is less than or substantially equal to 1/N of a number of previously obtained data elements in the historical data 215.

In at least one additional example embodiment, the buffer has a fixed size, M, and 2 M/k target regions are initially defined for the partitioning, where k is an anonymity parameter. The space is recursively repartitioned into successively smaller regions until a predefined condition is satisfied. Upon completion of the partitioning, each region has a population that is less than the number of previously obtained data elements in the historical data 215 divided by the number, N, of partitioned regions.

Location-Based k-Anonymity and Streaming

Data records typically comprise three kinds of attributes:

1. key identifiers, such as name or social security number, that directly identify the record owner, 2. quasi-identifiers, such as age or gender or location, that can be used in conjunction to accurately deduce the record owner, and 3. sensitive attributes, such as medical condition or salary, that the record owner would wish to remain private.

To achieve privacy, the key identifiers must often be removed from the data before being released. To achieve even further security, a popular technique known as k-anonymization requires that a batch of records can only be released when the manipulated quasi-identifiers of any record in the batch are indistinguishable from those of at least k−1 other records in the batch. In the example embodiments described herein, k-anonymization is performed with location as the quasi-identifier. In at least one example embodiment, each data element comprises an identifying portion and an associated sensitive portion. Each data element is assigned to one region based on the identifying portion. At least a portion of the data element is stored in the volatile memory 130 (e.g., a buffer). For example, for a given data element, the volatile memory 130 can store an identifier of the region where the data is assigned and the associated sensitive portion.

Of the two major techniques for achieving k-anonymity, suppression (removing entries from the dataset) and generalization (coarsening values so that more records share the same value) of the location quasi-identifier, the latter is commonly used and often referred to as spatial cloaking. See, e.g., K. LeFevre et al., "Incognito: Efficient Full-Domain k-Anonymity," 2005 Association for Computing Machinery (ACM) Special Interest Group on Management of Data (SIGMOD) Int'l Conf. on Management of Data (2005). In general, minimizing the number of suppressed data entries to accomplish k-anonymity is NP-hard (Non-Deterministic Polynomial-time hard), but admits an O(log k)-approximation. Algorithms based on these techniques and others have been described in many papers and two surveys can be found in V. Ciriani et al., "k-Anonymity," Secure Data Management in Decentralized Systems, 323-353 (2007) and B. Fung et al., "Privacy-Preserving Data Publishing: A Survey of Recent Developments," *ACM Comput. Surv.*, 42 (4).

At first, many of the algorithms developed for k-anonymization were designed as offline algorithms. That is, it was assumed that all the data would fit in memory. However, there has been a recognition that when data arrives quickly and there is a bound on the size of the memory 130 available to store the data, the techniques required for the design and analysis of algorithms to deal with such data differ from standard offline techniques. Algorithms dealing with such problems are referred to as streaming algorithms.

One or more example embodiments of the present invention focus on location anonymization in the streaming model as motivated, for example, by a set of privacy regulations that were introduced in the European Union. See, e.g., European Parliament, Directive 2002/58/EC of the European Parliament and Council of 12 Jul. 2002, concerning the processing of personal data and the protection of privacy in the electronic communications sector (directive on privacy and electronic communications), downloadable from http://europa.eu/legislation_summaries/information_society/legislative_framework/l24120_en.htm (2002).

These regulations make a distinction between a temporary volatile memory 130 (e.g., a buffer), where data are collected and a non-volatile memory 170 (e.g., a disk or solid state storage device, such as a flash store device), where data are stored. In particular, data do not need to be anonymized in the volatile memory 130 as the data are being collected. However, as soon as the data are written to the non-volatile memory 170, then the data need to be anonymized.

One or more example embodiments of the present invention aim to reduce a recorded region size of the data, assuming a fixed sized buffer.

EXAMPLES

A first example is Disease Tracking. Suppose a public health organization wishes to track the spread of a disease in an area. The raw data comprises an online sequence of the reported locations (e.g., home addresses) of patients that have this particular disease. However, such a quasi-identifier can easily identify a patient and therefore, in a non-volatile database that can be made public, the location data has to be anonymized. k-anonymization with spatial cloaking makes sure that at least k patients exist in a reported region in a public database, which makes identification of a specific patient difficult under reasonable effort.

A second example is the most commonly-used application of location k-anonymity, namely Location-Based Services (LBS). One type of LBS is mobile advertising. Mobile advertisers have to bid considerably more for an advertising slot if the user-location is known since they then have much more information with which to insert a relevant advertisement. Another type of LBS is that of a business-finding service, such as a service answering queries like "Please locate a nearby Chinese restaurant." However, a major problem with this type of service from a user-perspective is that it can reveal the user's identity and interests. For example, suppose that user identifier fields are anonymized but the LBS has access to another geographical database, e.g., an address list, then the LBS can match up the query with the address and make an inference as to who the user is. One or more example embodiments of the present invention therefore require a way to anonymize this data so that this type of attack cannot happen.

A final example comes from population studies based on location data. As already mentioned, cellular traces have been used for numerous studies on the mobility, economics and health of populations. However, cellular operators are subject to stringent privacy requirements regarding how sensitive data, such as location information, can be utilized.

Model

In the standard literature on location anonymization, the raw data in an LBS comprise a sequence of tuples $(u_{id}, r_n, x, y, t)$, where $u_{id}$ is the encoded user identity, $r_n$ is a message number, (x, y) are location coordinates and t is a time stamp. Note that the encoded user identifier $u_{id}$ cannot be mapped to a true user identity, but can be used to track returning visits to the service if necessary. With spatial cloaking, the output has the form $(u_{id}, r_n, S, t)$, where S is a two-dimensional geographic region. Since the $u_{id}, r_n, t$ parameters are preserved from input to output, location data are the relevant quasi-identifiers in the example embodiments. In particular, consider a sequence of location data $(x_1, y_1), (x_2, y_2), \ldots$ that arrives over time into a buffer of fixed size M, which can be viewed as a transient or volatile memory 130 that is allowed to hold raw data. Whenever the buffer becomes full, some location information in the buffer has to be written into the non-volatile memory 170. In various embodiments, the buffer is considered full or substantially full when the buffer has insufficient free space to store another complete element of streaming data 110. This case may be referred to as a "full buffer criterion." Due to this non-volatility of the memory, example embodiments assume that the written data are required to be k-anonymized. In particular, a region S that contains at least k location data points is recorded in the non-volatile memory 170, cloaking these k points.

One performance metric is the size of the recorded region S. The smaller the size of the recorded region S, the more accurate the anonymized region is relative to the original unanonymized locations. In addition, there are other considerations for the quality of the algorithm, for example, the complexity of computing the regions of interest.

One or more example embodiments of the present invention consider a model in which an online algorithm knows the location distribution a priori. In one example embodiment, discussed below in the section entitled "Preprocessing for Uniform Distributions," a uniform distribution is considered and an algorithm, PickMax, is described that partitions the space into M/k regions of equal size during a preprocessing phase, and records the region with the largest number of data points whenever the buffer is full during an anonymization phase. It can be shown that the PickMax algorithm converges the occupancies of the regions via a reduction to an equivalent balls-in-bins problem. In particular, the maximum occupancy of a region is close to 2 k, which allows for an improved PickMax algorithm that partitions the space to 2 M/k regions, thereby cutting the size of the recorded region in half. A substantially matching lower bound is also described that achieves k-anonymity, where the area of some region has to be at least $$\frac{1}{2M/k+1}$$

of the entire space.

In another example embodiment, discussed below in the section entitled "Preprocessing for Nonuniform Distributions," heuristics are employed during a preprocessing phase to partition the space into regions according to the given distribution so that the probability is equalized across the regions. As a result, algorithms such as PickMax can still be used.

Preprocessing Functions

Preprocessing for Uniform Distributions

In the first example embodiment, a uniform distribution of the location data is assumed. The term "space" is used herein to refer to the entire geographic area of interest and the term "region" is used to refer to each of the partitioned areas of space used for cloaking.

PickMax Algorithm

In the example PickMax algorithm, the space is partitioned into N=M/k regions where k is the anonymity parameter and M is the size of the buffer, e.g., the number of locations that can be stored in volatile memory prior to anonymization. Whenever the buffer is full, the region S is selected that contains the highest number of location data elements, the points in S are removed from the buffer 130 and S is recorded on the non-volatile memory 170 as the common coarse location for all these data elements in the non-volatile memory 170.

At any given point in time, it cannot be assumed that the locations in the buffer are uniformly distributed over the entire space, because different regions have been emptied at different times. It can be shown that this nonuniformity helps the performance of the example PickMax algorithm, since at any given time there is likely to be a region with significantly more than k points.

Consider a system with M balls and N bins, where M corresponds to the buffer size and N=M/k corresponds to the number of regions. M balls are thrown into N bins uniformly at random, and then the bin with the largest occupancy is picked and this bin is emptied, which corresponds to emptying the region with the largest number of location data. These removed balls, for example, x of them, are then redistributed again uniformly at random into N bins, which corresponds to an arrival of the next x location data into the N regions uniformly at random. This process of picking the largest bin, emptying the balls and redistributing them is then repeated. The number of balls in the largest bin that is picked is at least k, and therefore k-anonymity is accomplished.

Variants of the PickMax Algorithm

A first variant of the example PickMax algorithm partitions the space into 2 Mk+δ−1 regions for a small integer δ. The maximum occupancy then converges to k+δ balls. For convenience, this implementation is referred to as PickMax(2 M/k), even though the number of regions is not exactly 2 M/k, and the original implementation is referred to as PickMax(M/k).

A second variant of PickMax, PickK(M/k), selects a bin after it contains k balls but before it contains k+1 balls, or the maximum bin is picked after the buffer is full. Like PickMax, PickK(Mk) sets the number of regions to either Mk or 2 Mk+δ−1 for a small integer δ. Therefore, there are a total of four variants, PickMax(Mk), PickMax(2 M/k), PickK(Mk) and PickK(2 M/k).

Preprocessing for Non-Uniform Distributions

Additional embodiments of the invention partition a given space into regions when the location data arrives according to a nonuniform distribution over a given space. Three example heuristics are presented. The first two heuristics have the goal of having 1/N as the probability of an item landing in any of the N regions; the third heuristic aims to reduce the expected area of the picked region.

1. QuadTree Decomposition

As before, let M be the buffer size and k be the anonymity parameter. The target number of regions N would be 2 M/k if PickMax or PickK is used. Let p(b) be the probability that an item lands in region b. Initially, the entire space is the only region and p(b)=1. An example QuadTree decomposition has a simple recursive structure. As long as there exists a region b such that p(b)≥1/N, region b is further partitioned into four regions of equal size. One advantage of a QuadTree decomposition is simplicity. A potential downside of a QuadTree decomposition is that it may not result in exactly equal probability regions. The resulting probabilities fall in the range of [0,1/n].

In this manner, 2 M/k target regions are initially defined, and the space is recursively repartitioned into successively smaller regions to obtain a number, N, of regions of substantially equal size, e.g., geographical area. Two regions may be considered to have substantially equal size when their area differs by about ±10% or less. It will be appreciated that in some cases it may not be possible to define exactly 2 M/k target regions, e.g., when M is not an integer multiple of k. In such cases the space may be partitioned into approximately 2 M/k regions, e.g., a number of regions as close as possible to exactly 2 M/k given any mathematical constraints due to the values of M and k. Unless stated otherwise, a number of regions is regarded as being equal to 2 M/k in such cases. The repartitioning continues as long as there exists a region b such that a probability that a given one of the data elements is assigned to the region b is greater than 1/N.

2. EqProb Decomposition

A second example heuristic, referred to as EqProb decomposition, explicitly aims to equalize the probability in each region. The EqProb decomposition works as follows. As long as there exists a region b such that $p(b) \geq 1/N$, find a boundary, e.g., a vertical line in a rectilinear coordinate space, that divides b into two regions $b_1$ and $b_2$ such that $p(b_1)=p(b_2)=p(b)/2$, where $p(b_1)$ is a probability that a given data element is assigned to region $b_1$ and $p(b_2)$ is a probability that the given data element is assigned to region $b_2$. In at least one embodiment, whether probabilities $p(b_1)$ and $p(b_2)$, for example, are "substantially equal" is a function of, for example, one or more of how strictly the anonymity parameter, k, is enforced; a distribution of the probability, $p(b)$, with which data elements are assigned to regions; and a size, e.g., a number of elements, of the historical data 215 that is preprocessed by the preprocess function(s) 152. In some cases, without limitation, first and second probabilities may be considered substantially equal when the first probability differs from the second probability by ±5% or less of the second probability. Another boundary, e.g., a horizontal line in the rectilinear coordinate space, is then found that further divides $b_1$ into two regions $b_3$ and $b_4$, such that $p(b_3)=p(b_4)=p(b_1)/2$, and another boundary, e.g., another horizontal line in the rectilinear coordinate space, is then found that divides $b_2$ into two regions $b_5$ and $b_6$, such that $p(b_5)=p(b_6)=p(b_2)/2$, where $p(b_i)$ is a probability that a given data element is assigned to region $b_i$.

3. MinArea Decomposition

An example MinArea decomposition aims to reduce the expected area of the picked region. Let $A(b)$ be the area of region b. For PickK, a region is picked the moment it contains k locations. In this situation, $\Sigma_b p(b) A(b)$ is the expected area of the picked region. (To be precise, it is the expectation, over all locations, of the region that contains the location when the location is removed from the buffer.) A decomposition for a two-dimensional space is motivated by the exact optimization for the one-dimensional case which can be done using standard multi-variate optimization techniques. For example, suppose the distribution of points in the interval [0,1] has a probability density function (pdf) given by $f(x)=2x$. For N=2, the optimization problem is to choose a $\gamma$, with the first region [0,$\gamma$] and the second region [$\gamma$,1], so that the expected size of the picked region expressed below is minimized.

$$E = \gamma p([0, \gamma]) + (1 - \gamma)p([\gamma, 1]) = \gamma^3 + (1 - \gamma)(1 - \gamma^2) = 1 - \gamma - \gamma^2 + 2\gamma^3$$

Numerically, by setting $$\gamma = \frac{1 + \sqrt{7}}{6} \approx 0.608,$$

then E is minimized to $$\frac{44 - 7\sqrt{7}}{54} \approx 0.472.$$

To convert this type of optimization to the two-dimensional case is more challenging since there is no simple analogue to choosing the size of an interval. The regions in the two dimensional space could have an arbitrary shape. The third heuristic MinArea decomposition is a refinement of the EqProb decomposition. In particular, whenever a region b needs to be divided into two regions $b_1$ and $b_2$, this division is performed so as to substantially minimize a weighted area $A(b_1)p(b_1)+A(b_2)p(b_2)$ bordered by, for example, either a vertical or a horizontal line (or another boundary), where $A(b_1)$ is an area of region $b_1$, $A(b_2)$ is an area of region $b_2$, $p(b_1)$ is a probability that a given data element is assigned to region $b_1$ and $p(b_2)$ is a probability that the given data element is assigned to region $b_2$. A weighted area may be considered substantially minimized when its value is within about ±5% of an absolute minimum that could be obtained but for the existence of various constraints, e.g., boundary conditions imposed by neighboring areas or geographical features.

k-Anonymization Functions

Figure 4:
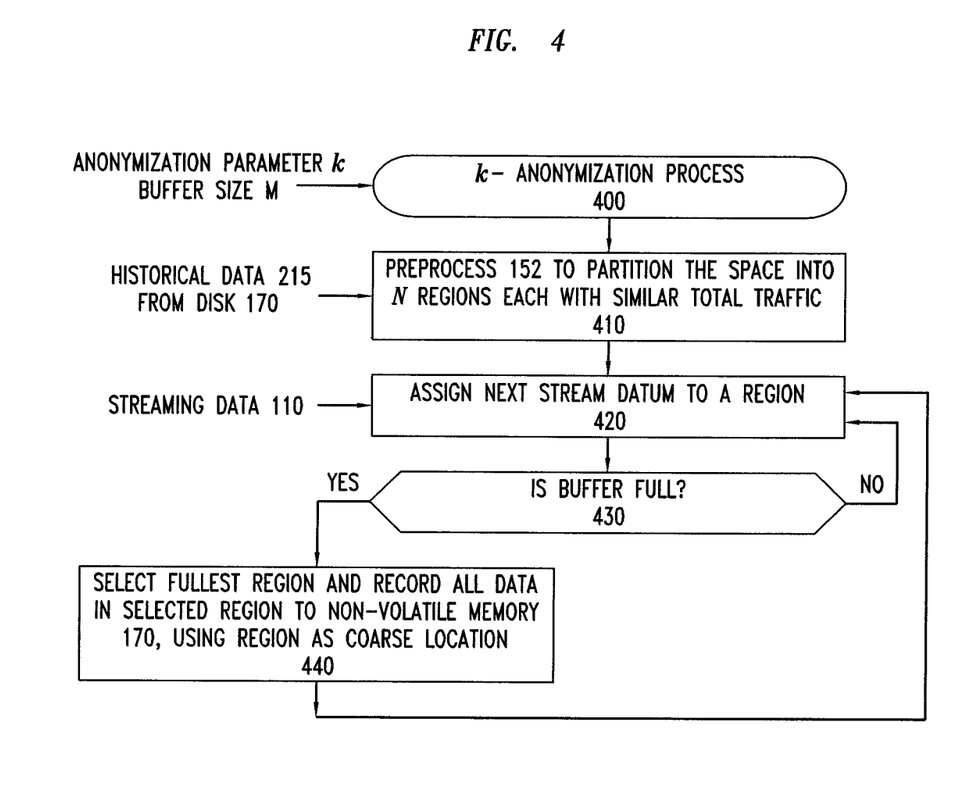
FIGS. 4 and 5 are flow charts illustrating example alternate implementations of a k-anonymization process according to various embodiments of the invention.

FIG. 4 is a flow chart illustrating an example implementation of a k-anonymization process 400 according to one embodiment of the invention. As shown in FIG. 4, the example k-anonymization process 400 receives the anonymity parameter, k, and the fixed size, M, of the buffer as inputs. The example k-anonymization process 400 then initially applies one or more of the preprocessing functions 152 described herein during step 410 to the historical data 215 obtained from the non-volatile memory 170 to partition the space into N regions each with similar total traffic, in the manner described above.

During step 420, the example k-anonymization process 400 assigns the next datum from the streaming data 110 to a region. A test is performed during step 430 to determine if the buffer is full. If it is determined during step 430 that the buffer is not full, then program control returns to step 420 and continues in the manner described above. If, however, it is determined during step 430 that the buffer is full, then the example k-anonymization process 400 selects the fullest region during step 440 and records all data in the selected region to non-volatile memory 170, using the region as a coarse location in the example embodiment. Program control returns to step 420 and continues in the manner described above.

Figure 5:
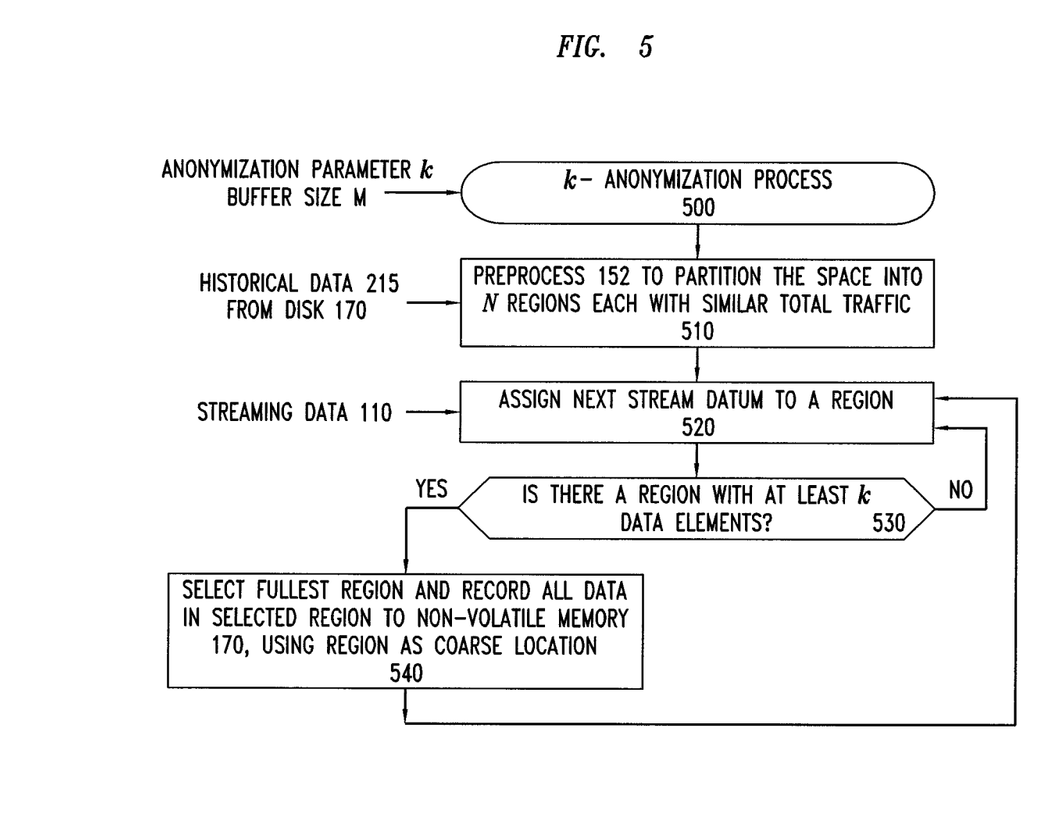

FIG. 5 is a flow chart illustrating an example alternate implementation of a k-anonymization process 500 according to another embodiment of the invention. As shown in FIG. 5, the example k-anonymization process 500 receives the anonymity parameter, k, and the fixed size, M, of the buffer as inputs, in a similar manner as the embodiment of FIG. 4. The example k-anonymization process 500 then initially applies one or more of the preprocessing functions 152 described herein during step 510 to the historical data 215, obtained from the non-volatile memory 170, to partition the space into N regions each with similar total traffic, in the manner described above.

During step 520, the example k-anonymization process 500 assigns the next datum from the streaming data 110 to a region. A test is performed during step 530 to determine if there is a region with at least k data elements. This case may also be considered a full buffer criterion. If it is determined during step 530 that there is not a region with at least k data elements, then program control returns to step 520 and continues in the manner described above. If, however, it is determined during step 530 that there is a region with at least k data elements, then the example k-anonymization process 500 selects the fullest region during step 540 and records all data in the selected region to non-volatile memory 170, using the region as a coarse location in the example embodiment. Program control returns to step 520 and continues in the manner described above.

System and Article of Manufacture Details

While FIGS. 2, 4 and 5 show an example sequence of steps, in various embodiments, the sequence may be varied. Various permutations of the algorithm are contemplated as alternate embodiments.

While various embodiments of the present inventions have been described with respect to processing steps in a software program, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit, micro-controller, or general-purpose computer. Such hardware and software may be embodied within circuits implemented within an integrated circuit.

Thus, the functions of the present inventions can be embodied in the form of methods and apparatuses for practicing those methods. One or more aspects of the present inventions can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus configured according to one or more embodiments of the invention. When implemented on a general-purpose processor, the program code segments combine with the processor to provide a device that operates analogously to specific logic circuits. Embodiments can also be implemented in one or more of an integrated circuit, a digital signal processor, a microprocessor, and a micro-controller.

As is known in the art, the methods and apparatus discussed herein may be distributed as an article of manufacture that itself comprises a tangible computer readable recordable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)). The term "non-volatile storage medium" as used herein should be understood to exclude transitory, propagating signals. Any medium known or developed that can store information suitable for use with a computer system may be used. The computer-readable code means is any mechanism for allowing a computer to read instructions and data, such as magnetic variations on a magnetic medium or height variations on the surface of a compact disk.

The computer systems described herein each optionally contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

We claim:

1. A method, comprising:

obtaining a partitioning of a feature space comprising a distribution of previously obtained data elements into a plurality of regions based on said distribution;

receiving a data stream comprising a plurality of newly obtained data elements, wherein each of said newly obtained data elements comprises an identifying portion and an associated sensitive portion;

assigning, using at least one processing device, each of said plurality of newly obtained data elements to one of said plurality of regions based on said identifying portion;

determining, using said at least one processing device, if a full buffer criterion is satisfied for a buffer that stores at least a portion of said plurality of newly obtained data elements; and selecting, using said at least one processing device, one of said plurality of regions having a largest number of said newly obtained data elements and recording said associated sensitive portions of said newly obtained data elements in said selected one of said plurality of regions to a non-volatile storage medium on the condition that said full buffer criterion is satisfied.

2. The method of claim 1, wherein each of said plurality of regions has a substantially equal number of said previously obtained data elements.

3. The method of claim 1, wherein said obtaining further comprises partitioning said feature space into N regions, wherein each of said plurality of regions has a population that is less than or substantially equal to 1/N of a number of said previously obtained data elements.

4. The method of claim 1, wherein said full buffer criterion comprises determining if one of said plurality of regions comprises at least k data elements, where k is an anonymity parameter.

5. The method of claim 1, wherein said buffer has a fixed size, M, and wherein said obtaining further comprises partitioning said feature space into M/k regions, where k is an anonymity parameter.

6. The method of claim 1, wherein said buffer has a fixed size, M, and wherein said obtaining further comprises partitioning said feature space into approximately 2M/k regions, where k is an anonymity parameter.

7. The method of claim 1, wherein said buffer has a fixed size, M, and wherein said obtaining further comprises defining 2M/k target regions, where k is an anonymity parameter, and recursively repartitioning said feature space into successively smaller regions to obtain a number, N, of regions of substantially equal size, wherein said repartitioning continues on the condition that there exists a region b such that a probability that a given one of said newly obtained data elements is assigned to said region b is greater than 1/N.

8. The method of claim 1, wherein said obtaining substantially equalizes a probability that a given one of said previously obtained data elements is assigned to any one of said plurality of regions.

9. The method of claim 8, wherein said buffer has a fixed size, M, and wherein said obtaining further comprises:
defining 2M/k target regions, where k is an anonymity parameter, and determining a first boundary that divides a region b into two regions $b_1$ and $b_2$ such that a probability, $p(b_1)$, that a given one of said data elements is assigned to said region $b_1$ is substantially equal to a probability, $p(b_2)$, that said given one of said data elements is assigned to said region $b_2$;
determining a second boundary that further divides region $b_1$ into two regions $b_3$ and $b_4$ such that a probability, $p(b_3)$, that a given one of said data elements is assigned to said region $b_3$ is substantially equal to a probability, $p(b_4)$, that said given one of said data elements is assigned to said region $b_4$; and
determining a third boundary that further divides region $b_2$ into two regions $b_5$ and $b_6$ such that a probability, $p(b_5)$, that a given one of said data elements is assigned to said region $b_5$ is substantially equal to a probability, $p(b_6)$, that said given one of said data elements is assigned to said region $b_6$.

10. The method of claim 1, wherein said obtaining reduces an expected area of said selected one of said plurality of regions.

11. The method of claim 10, wherein said buffer has a fixed size, M, and wherein said obtaining further comprises:
defining 2M/k target regions, where k is an anonymity parameter;
determining a first boundary that divides a region b into two regions $b_1$ and $b_2$ so as to substantially minimize a weighted area $A(b_1)p(b_1)+A(b_2)p(b_2)$ along said first boundary, where $A(b_1)$ is an area of region $b_1$, $A(b_2)$ is an area of region $b_2$, $p(b_1)$ is a probability that a given one of said data elements is assigned to said region $b_1$ and $p(b_2)$ is a probability that said given one of said data elements is assigned to said region $b_2$;
determining a second boundary that further divides region $b_1$ into two regions $b_3$ and $b_4$ so as to substantially minimize a weighted area $A(b_3)p(b_3)+A(b_4)p(b_4)$ along said second boundary, where $A(b_3)$ is an area of region $b_3$, $A(b_4)$ is an area of region $b_4$, $p(b_3)$ is a probability that a given one of said data elements is assigned to said region $b_3$ and $p(b_4)$ is a probability that said given one of said data elements is assigned to said region $b_4$; and
determining a third boundary that divides region $b_2$ into two regions $b_5$ and $b_6$ so as to substantially minimize a weighted area $A(b_5)p(b_5)+A(b_6)p(b_6)$ along said third boundary, where $A(b_5)$ is an area of region $b_5$, $A(b_6)$ is an area of region $b_6$, $p(b_5)$ is a probability that a given one of said data elements is assigned to said region $b_5$ and $p(b_6)$ is a probability that said given one of said data elements is assigned to said region $b_6$.

12. The method of claim 1, wherein said plurality of regions comprise geographic regions.

13. A non-transitory machine-readable recordable storage medium, wherein one or more software programs stored thereon implement the steps of the method of claim 1 when executed by one or more processing devices.

14. A system, comprising:
a memory; and
at least one processing device, coupled to the memory, operative to:
obtain a partitioning of a feature space comprising a distribution of previously obtained data elements into a plurality of regions based on said distribution;
receive a data stream comprising a plurality of newly obtained data elements, wherein each of said newly obtained data elements comprises an identifying portion and an associated sensitive portion;
assign, using said at least one processing device, each of said plurality of newly obtained data elements to one of said plurality of regions based on said identifying portion;
determine, using said at least one processing device, if a full buffer criterion is satisfied for a buffer that stores at least a portion of said plurality of newly obtained data elements; and
select, using said at least one processing device, one of said plurality of regions having a largest number of said newly obtained data elements and record said associated sensitive portions of said newly obtained data elements in said selected one of said plurality of regions to a non-volatile storage medium on the condition that said full buffer criterion is satisfied.

15. The system of claim 14, wherein each of said plurality of regions has a substantially equal number of said previously obtained data elements.

16. The system of claim 14, wherein said obtaining further comprises partitioning said feature space into N regions, wherein each of said plurality of regions has a population that is less than or substantially equal to 1/N of a number of said previously obtained data elements.

17. The system of claim 14, wherein said full buffer criterion comprises determining if one of said plurality of regions comprises at least k data elements, where k is an anonymity parameter.

18. The system of claim 14, wherein said buffer has a fixed size, M, and wherein said obtaining comprises partitioning said feature space into M/k regions, where k is an anonymity parameter.

19. The system of claim 14, wherein said buffer has a fixed size, M, and wherein said obtaining further comprises partitioning said feature space into approximately 2M/k regions, where k is an anonymity parameter.

20. The system of claim 14, wherein said buffer has a fixed size, M, and wherein said obtaining further comprises defining 2M/k target regions, where k is an anonymity parameter, and recursively repartitioning said feature space into successively smaller regions to obtain a number, N, of regions of substantially equal size, wherein said repartitioning continues on the condition that there exists a region b such that a probability that a given one of said newly obtained data elements is assigned to said region b is greater than 1/N.

21. The system of claim 14, wherein said obtaining substantially equalizes a probability that a given one of said previously obtained data elements is assigned to any one of said plurality of regions.

22. The system of claim 14, wherein said obtaining reduces an expected area of said selected one of said plurality of regions.

23. A method, comprising:
configuring at least one processing system element to obtain a partitioning of a feature space comprising a distribution of previously obtained data elements into a plurality of regions based on said distribution;
configuring at least one processing system element to receive a data stream comprising a plurality of newly obtained data elements, wherein each of said newly obtained data elements comprises an identifying portion and an associated sensitive portion;

configuring at least one processing system element to assign each of said plurality of newly obtained data elements to one of said plurality of regions based on said identifying portion;

configuring at least one processing system element to determine if a full buffer criterion is satisfied for a buffer that stores at least a portion of said plurality of newly obtained data elements; and configuring at least one processing system element to select one of said plurality of regions having a largest number of said newly obtained data elements and record said associated sensitive portions of said newly obtained data elements in said selected one of said plurality of regions to a non-volatile storage medium on the condition that said full buffer criterion is satisfied.

* * * * *